(12) United States Patent
Dow

(10) Patent No.: US 6,446,174 B1
(45) Date of Patent: Sep. 3, 2002

(54) COMPUTER SYSTEM WITH DRAM BUS

(75) Inventor: Keith Dow, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 09/613,492

(22) Filed: Jul. 11, 2000

(51) Int. Cl.$^7$ .............................................. G06F 12/00
(52) U.S. Cl. ........................ 711/154; 711/101; 711/104; 711/105
(58) Field of Search ................................ 711/154, 105, 711/104, 101

(56) References Cited

U.S. PATENT DOCUMENTS

| | | | |
|---|---|---|---|
| 5,815,168 A | 9/1998 | May | 345/516 |
| 5,828,881 A | 10/1998 | Wang | 395/680 |
| 5,889,726 A | 3/1999 | Jeddeloh | 365/233 |
| 5,969,728 A | 10/1999 | Dye et al. | 345/515 |
| 6,003,121 A | 12/1999 | Wirt | 711/170 |

Primary Examiner—Matthew Kim
Assistant Examiner—Stephen Elmore
(74) Attorney, Agent, or Firm—Blakely, Sokoloff, Taylor & Zafman LLP

(57) ABSTRACT

A memory system that includes a memory controller hub (MCH) to control access to dynamic random-access memory (DRAM) devices, wherein the MCH has a first channel for communicating with the DRAM devices according to a first protocol. Also included is a memory repeater hub (MRH) of a first type having an input connected to the first channel of the MCH and providing second and third channels as outputs, the second and third channels operating in accordance with the first protocol. A first pair of MRHs of a second type each has an input connected to the second channel, with each providing a pair of DRAM channels that operate in accordance with a second protocol. The system further includes a second pair of MRHs of the second type, each having an input connected to the third channel, with each providing a pair of DRAM channels that operate in accordance with the second protocol.

16 Claims, 3 Drawing Sheets

COMPUTER SYSTEM WITH DRAM BUS

FIELD OF THE INVENTION

The present invention relates generally to the field of computer systems; more particularly, to computer memory systems and memory architectures that provide expanded memory capacity at high data rates.

BACKGROUND OF THE INVENTION

The faster speeds of modern data processing systems has led to the development of new memory systems that can provide data at faster rates. To achieve faster data rates, many of today's computer systems include a host processor connected to a memory controller that controls access to a memory subsystem, which may comprise dynamic random-access memory (DRAM) devices. An example of such system is found in U.S. Pat. No. 5,828,881, which teaches a memory system that employs high-speed DRAM or Rambus™ memory (RDRAM) technology. Rambus™ is a trademark of Rambus, Inc., of Mountain View, Calif. Another technology, known as Direct RDRAM™ (Rambus dynamic RAM), employs interleaved banks of dynamic random-access memory cells that can be rapidly accessed. For example, U.S. Pat. No. 5,889,726 discloses the use of a memory controller for accomplishing fast memory read and write operations to a memory having a synchronous clocked interface, which may include a Rambus interface.

It is known that a number of such memory devices may be connected to a memory channel, e.g., a Direct Rambus™ channel or Direct RDRAM™ channel, according to a specified protocol. By way of background, U.S. Pat. No. 6,003, 121 provide examples in which memory repeater hubs are utilized in various memory system configurations with Direct RDRAM™ channels to achieve expanded memory capacity. U.S. Pat. No. 5,828,382 also describes a graphics display system in which data is transferred through a memory controller to Rambus RDRAMs.

FIG. 1 illustrates a typical prior art memory system 10, which includes a memory controller hub (MCH) 11 that communicates with a memory repeater hub (MRH) 12 via a Rambus channel 14. Rambus channel 14 allows communication back and forth between MCH 11 and MRH 12 according to a specified protocol. At present, up to two memory repeater hubs may be connected to a single Rambus channel 14. Essentially, MRH 12 achieves a 2:1 multiplexing of the channel lines, such that MRH 12 provides two RDRAM Rambus channels 15a & 15b that communicate with the actual Rambus RDRAM devices.

As is well understood, the RDRAM Rambus channel operates in accordance with a separate protocol that differs from the protocol specified for the Rambus channel output from MCH 11. In other words, according to Rambus memory technology there is one protocol for communicating with RDRAM devices, and another, different protocol used to communicate with the memory repeater hubs. The design of MCH 11 is such that it permits communications directly to the RDRAMs and also to the MRHs.

Despite the widespread use of RDRAM technology, the number of memory repeater hubs that can be connected to a single Rambus channel remains limited. Present memory system implementations are restricted to a maximum of four RDRAM channels. Thus, there exists an unfulfilled need for new devices or system configurations to expand the number of RDRAM channels which can be supported.

BRIEF DESCRIPTION OF THE DRAWINGS

The present invention will be understood more fully from the detailed description which follows and from the accompanying drawings, which however, should not be taken to limit the invention to the specific embodiments shown, but are for explanation and understanding only.

DETAILED DESCRIPTION

Figure 1:
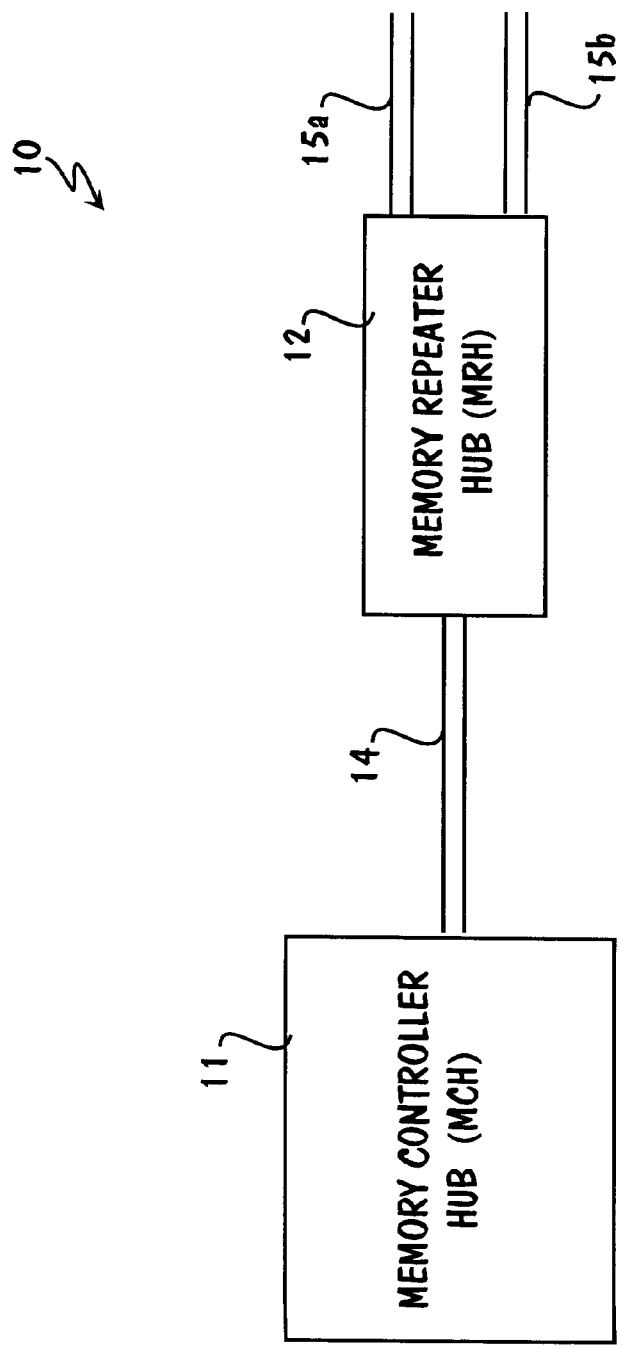
FIG. 1 shows a prior art memory system configuration.

Many processor-based computers employ DRAM devices as part of their memory systems. For instance, the Pentium® processors manufactured by Intel Corporation of Santa Clara, Calif. sometimes utilize Rambus memory technology. In the past, memory repeater hubs (MRHs) for Rambus memory technology were created to increase the amount of memory on a channel. Such an implementation is shown in FIG. 1 discussed previously. The present problem is that only two MRHs can be put on a channel, which means that a maximum of only four RDRAM Rambus channels may be supported.

Figure 2:
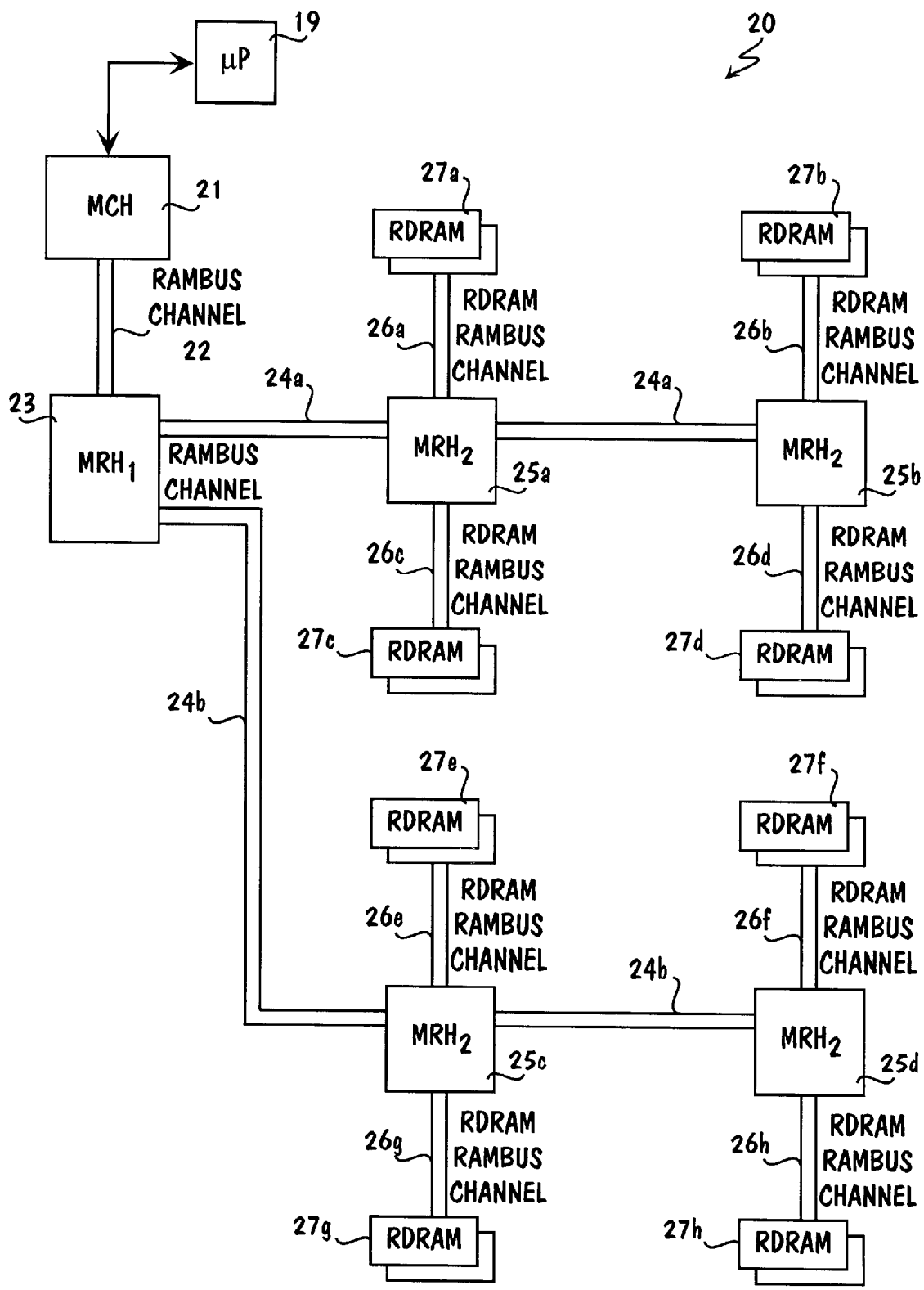
FIG. 2 illustrates a system that provides eight RDRAM channels according to one embodiment of the present invention.

FIG. 2 illustrates a system 20 that supports eight RDRAM channels in accordance with one embodiment of the present invention. System 20 comprises a processor 19 coupled to a memory controller hub (MCH) 21, which provides read and write access to RDRAM devices 27. MCH 21 provides a single Rambus channel 22 that allows communications back and forth between the MRHs according to the well-known Rambus channel protocol.

Two different types of memory repeater hubs (denoted $MRH_1$ and $MRH_2$) are utilized in the system shown in FIG. 2. The $MRH_2$ devices 25 comprise conventional memory repeater hub devices as discussed in connection with FIG. 1. Each $MRH_2$ device 25 has an input connected to a Rambus channel 24 and providing a pair of RDRAM Rambus channels 26 as outputs. The RDRAM Rambus channels 26 are connected to RDRAM devices 27. Each $MRH_2$ device 25 supports the RDRAM Rambus channel output protocol, which differs slightly from the Rambus channel protocol associated with channels 22 and 24.

The $MRH_1$ device 23 comprises the same circuitry as $MRH_2$ devices 25, except for a logic change that allows it to communicate with other MRHs along the channel. Essentially, $MRH_1$ device 23 is a $MRH_2$ device that also incorporates the logic circuitry of MCH 21 that enables MCH 21 to communicate with MRHs according to the Rambus channel protocol. In other words, $MRH_1$ device 23 extends the output Rambus channel protocol to provide as outputs Rambus channels 24a & 24b, each of which is connected to pairs of $MRH_2$ devices. For instance, FIG. 2 shows $MRH_1$ device 23 providing Rambus channels 24a & 24b as outputs, with Rambus channel 24a connected to $MRH_2$ devices 25a & 25b, and Rambus channel 24b connecting to $MRH_2$ devices 25c & 25d.

Continuing with the description of the embodiment of FIG. 2, $MRH_2$ device 25a provides RDRAM Rambus channels 26a & 26c as outputs respectively coupled to RDRAMs 27a & 27c. $MRH_2$ device 25b provides RDRAM Rambus channels 26b & 26d as outputs respectively coupled to RDRAMs 27b & 27d. $MRH_2$ device 25c provides RDRAM Rambus channels 26e & 26g coupled to RDRAMs 27e & 27g, respectively. And $MRH_2$ device 25d provides RDRAM Rambus channels 26f & 26h coupled to RDRAMs 27f & 27h, respectively. Thus, the embodiment of FIG. 2 overcomes the limitations inherent in the prior art by providing eight RDRAM Rambus channels.

Figure 3:
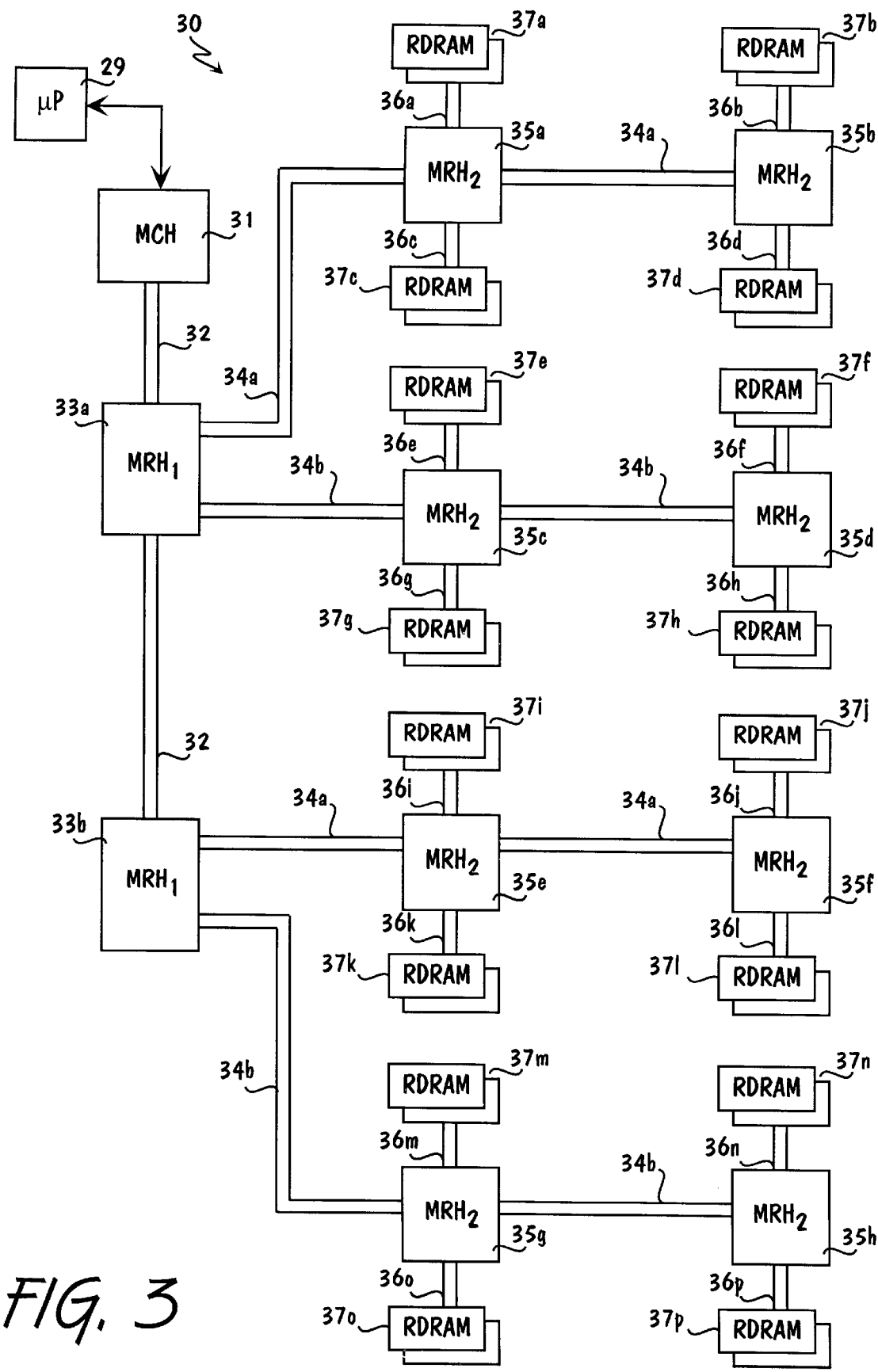
FIG. 3 illustrates a system that provides sixteen RDRAM channels according to another embodiment of the present invention.

The embodiment of FIG. 3 takes the concept of FIG. 2 one step further to achieve a system that provides sixteen RDRAM Rambus channels, or four times as much memory as prior art systems. System 30 of FIG. 3 includes a processor 29 coupled to MCH 31 for accessing RDRAM devices 37. Rambus channel 32 provided by MCH 31 is shown supporting two MRH$_1$ devices 33a & 33b, each of which a pair of Rambus channels 34a & 34b as outputs. Channel 34a from MRH$_1$ device 33a connects to MRH$_2$ devices 35a & 35b, whereas channel 34a from MRH$_1$ device 33b connects to MRH$_2$ devices 35e & 35f. Channel 34b from MRH$_1$ device 33a connects to MRH$_2$ devices 35c & 35d, and channel 34b from MRH$_1$ device 33b connects to MRH$_2$ devices 35g & 35h.

The diagram of FIG. 3 illustrates each MRH$_2$ device providing a pair of RDRAM Rambus channels as outputs. For example, MRH$_2$ device 35a provides RDRAM Rambus channels 36a & 36c as outputs respectively coupled to RDRAMs 37a & 37c. MRH$_2$ device 35b provides RDRAM Rambus channels 36b & 36d as outputs respectively coupled to RDRAMs 37b & 37d. MRH$_2$ device 35c provides RDRAM Rambus channels 36e & 36g coupled to RDRAMs 37e & 37g, respectively. And MRH$_2$ device 35d provides RDRAM Rambus channels 36f & 36h coupled to RDRAMs 37f & 37h, respectively.

In the bottom half of FIG. 3, MRH$_2$ device 35e provides RDRAM Rambus channels 36i & 36k as outputs respectively coupled to RDRAMs 37i & 37k. MRH$_2$ device 35f provides RDRAM Rambus channels 36j & 36l as outputs respectively coupled to RDRAMs 37j & 37l. MRH$_2$ device 35g provides RDRAM Rambus channels 36m & 36o coupled to RDRAMs 37e & 37g, respectively. Completing the diagram, MRH$_2$ device 35h provides RDRAM Rambus channels 36n & 36p coupled to RDRAMs 37n & 37p, respectively.

I claim:

1. A memory system comprising:
   a memory controller hub (MCH) to control access to dynamic random-access memory (DRAM) devices, the MCH having a first channel for communicating with the DRAM devices according to a first protocol;
   a memory repeater hub (MRH) of a first type having an input connected to the first channel of the MCH and providing second and third channels as outputs, the second and third channels operating in accordance with the first protocol;
   a first pair of MRHs of a second type, each having an input connected to the second channel and each providing a pair of DRAM channels that operate in accordance with a second protocol;
   a second pair of MRHs of the second type, each having an input connected to the third channel and each providing a pair of DRAM channels that operate in accordance with the second protocol.

2. The memory system of claim 1 wherein DRAM devices comprises RDRAM.

3. The memory system of claim 2 wherein the first protocol comprises a Rambus channel protocol.

4. The memory system of claim 3 wherein the second protocol comprises a RDRAM Rambus channel protocol.

5. The memory system of claim 1 wherein the MCH and the MRH of the first type both include logic circuitry to communicate according to both the first and second protocols.

6. A computer system comprising:
   a processor;
   a memory system, which includes:
      DRAM devices;
      a memory controller hub (MCH) to control access to the DRAM devices, the MCH having a first channel for communicating with the DRAM devices according to a first protocol;
      a memory repeater hub (MRH) of a first type having an input connected to the first channel of the MCH and providing second and third channels as outputs, the second and third channels operating in accordance with the first protocol;
      a first pair of MRHs of a second type, each having an input connected to the second channel and each providing a pair of DRAM channels that operate in accordance with a second protocol;
      a second pair of MRHs of the second type, each having an input connected to the third channel and each providing a pair of DRAM channels that operate in accordance with the second protocol.

7. The computer system of claim 6 wherein the DRAM devices comprises RDRAM.

8. The computer system of claim 7 wherein the first protocol comprises a Rambus channel protocol.

9. The computer system of claim 8 wherein the second protocol comprises a RDRAM Rambus channel protocol.

10. The computer system of claim 6 wherein the MCH and the MRH of the first type both include logic circuitry to communicate according to both the first and second protocols.

11. A computer system comprising:
    a processor;
    a memory system, which includes:
       DRAM devices;
       a memory controller hub (MCH) to control access to the DRAM devices, the MCH having a first channel for communicating with the DRAM devices according to a first protocol;
       a first memory repeater hub (MRH) of a first type having an input connected to the first channel of the MCH and providing second and third channels as outputs, the second and third channels operating in accordance with the first protocol;
       a second memory repeater hub (MRH) of the first type having an input connected to the first channel of the MCH and also providing the second and third channels as outputs;
       a first pair of MRHs of a second type, each having an input connected to the second channel of the first MRH and each providing a pair of DRAM channels that operate in accordance with a second protocol;
       a second pair of MRHs of the second type, each having an input connected to the third channel of the first MRH and each providing a pair of DRAM channels that operate in accordance with the second protocol;
       a third pair of MRHs of a second type, each having an input connected to the second channel of the second MRH and each providing a pair of DRAM channels that operate in accordance with a second protocol;
       a second pair of MRHs of the second type, each having an input connected to the third channel of the second MRH and each providing a pair of DRAM channels that operate in accordance with the second protocol.

12. The computer system of claim 11 wherein the DRAM devices comprises RDRAM.

13. The computer system of claim 12 wherein the first protocol comprises a Rambus channel protocol.

14. The computer system of claim 13 wherein the second protocol comprises a RDRAM Rambus channel protocol.

15. The computer system of claim 11 wherein the MCH and the first MRH of the first type both include logic circuitry to communicate according to both the first and second protocols.

16. The computer system of claim 15 wherein the second MRH of the first type also includes the logic circuitry to communicate according to both the first and second protocols.

* * * * *

UNITED STATES PATENT AND TRADEMARK OFFICE
CERTIFICATE OF CORRECTION

PATENT NO.    : 6,446,174 B1
DATED         : September 3, 2002
INVENTOR(S)   : Dow It is certified that error appears in the above-identified patent and that said Letters Patent is hereby corrected as shown below:

Column 2,
Line 34, delete "MRH, and", insert -- $MRH_1$ and --.

Signed and Sealed this

Eighteenth Day of March, 2003

JAMES E. ROGAN
*Director of the United States Patent and Trademark Office*